March 1, 1966    H. R. REINER    3,237,310
TIRE TREAD THICKNESS GAUGING APPARATUS
Filed Jan. 11, 1960    3 Sheets-Sheet 1

*INVENTOR.*
HOWARD R. REINER
BY
*J. B. Holden*
ATTORNEY

March 1, 1966 H. R. REINER 3,237,310
TIRE TREAD THICKNESS GAUGING APPARATUS
Filed Jan. 11, 1960 3 Sheets-Sheet 3
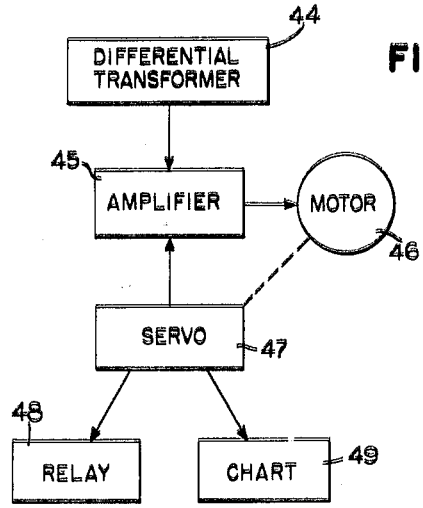
FIG. 8
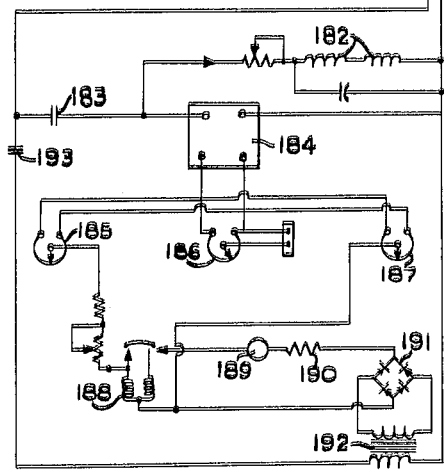
FIG. 7
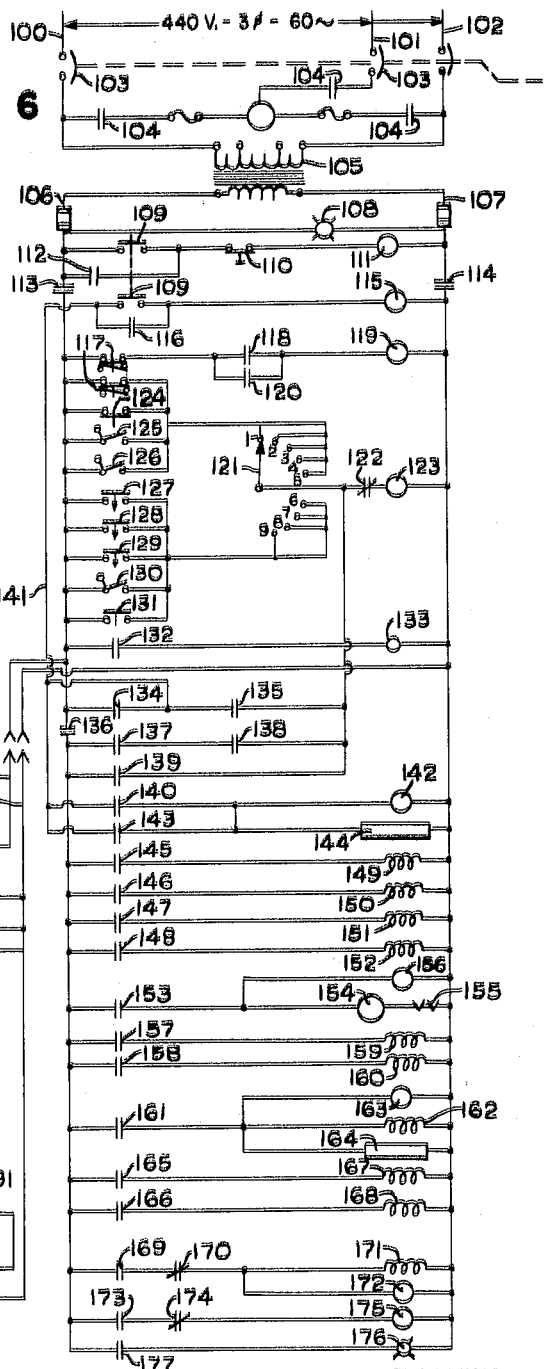
INVENTOR.
HOWARD R. REINER
BY
J. B. Holden
ATTORNEY United States Patent Office 3,237,310
Patented Mar. 1, 1966

3,237,310
TIRE TREAD THICKNESS GAUGING
APPARATUS
Howard R. Reiner, Akron, Ohio, assignor to The Goodyear Tire & Rubber Company, Akron, Ohio, a corporation of Ohio
Filed Jan. 11, 1960, Ser. No. 1,616
3 Claims. (Cl. 33—143)

This invention relates to a method and apparatus for determining undesirable ride characteristics of pneumatic tires and particularly variations in tread thickness which may produce thump, roughness, and other annoyances.

The problem of satisfactorily determining variations in the tread thickness of tires while maintaining a high production rate has long presented difficulties. It has previously been necessary to limit testing to sampling methods due to the relatively slow and cumbersome procedures and apparatus available for testing tires. However, modern high speed travel requires that substantially all tires be inspected and tested to meet certain minimum but rigorous standards. This has resulted in a requirement for a method and apparatus for rapidly and very accurately testing tires for tread thickness variation on a production line basis. It will be found as the description of the present invention proceeds that a method and apparatus for rapidly testing tires on a production line basis has been developed and that the present invent minimizes the manual labor necessary for processing the tires. Furthermore, the present invention assures that a relatively unskilled operator may be used to perform the testing function.

It is an object of the present invention to provide method and apparatus for rapidly and accurately testing tires for tread thickness variation. It is a further object of the present invention to provide a device which has a high degree of reproducibility in its test results. It is a still further object of the present invention to provide a device for testing tires on a production line basis and in a highly automatic fashion to reduce manual labor. These and other objects of the present invention will become apparent from the following description and drawings in which:

FIG. 6 is a schematic wiring diagram of the control circuit associated with the device shown in FIG. 1;

FIG. 7 is a schematic of the recording and indicating circuit of the device shown in FIG. 1; and FIG. 8 is a block diagram of the indicating and recording servo loop utilized in the present invention.

Figure 1:
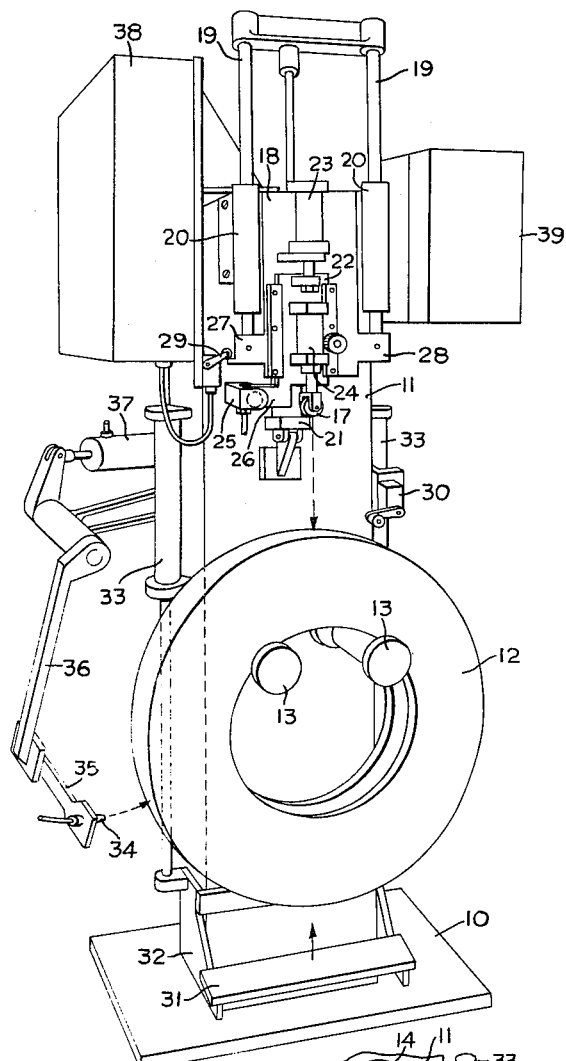
FIG. 1 is a front elevation view of a tread thickness gauge according to the present invention.
Figure 2:
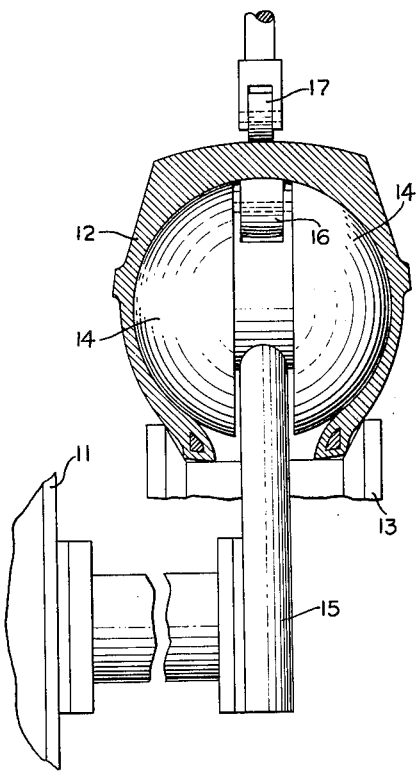
FIG. 2 is a cut-away view of a portion of the apparatus of FIG. 1.
Figure 3:
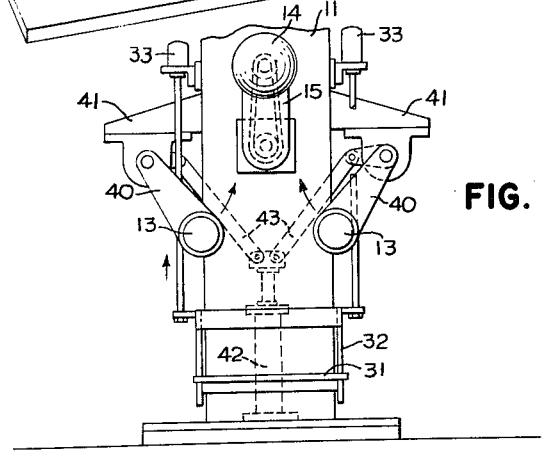
FIG. 3 is a detailed view of the tire locking mechanism of the present invention.

The general construction of the tread thickness gauge is shown in FIGS. 1 through 3. The gauge has a frame comprising a base 10 having an upright pedestal 11 on which are mounted the various operating portions of the gauge. A tire 12 is mounted on the drive mechanism, which may be seen in detail in FIG. 2, and held in "pulled down" position by rollers 13. The tire support means which is also a portion of the drive mechanism is shown in FIG. 2 and consists essentially of a pair of rotatable hemispherical members 14 adapted to ride on the tire tread interior and impart rotation to the tire. The drive members 14 which may be smooth surfaced as well as knurled are rotated through a conventional gear and chain mechanism 15 powered by an electric motor mounted on the rear of pedestal 11. The drive gear and chain mechanism is conventional and need not be further described here. An idler roller 16 is provided between the hemispherical members 14 and rides substantially along the tread or crown center line at the tire interior to assist in positioning the tire and to provide a firm surface against which the tire and the superimposed reciprocative gauging wheel 17 may ride. The gauging "head" comprises a movable plate or bracket 18 mounted on vertical shafts 19 by means of substantially cylindrical collars 20. The bracket 18 is moved up and down by means of a conventional pneumatic cylinder 21 mounted on pedestal 11. A secondary bracket 22 is slidably mounted on bracket 18 by similar means and is movable up and down by cylinder 23 mounted on bracket 18. The bracket 22 has mounted thereon the rotatable gauging wheel 17 which may also take the form of a foot or slide, together with its associated differential transformer 24, the movement of shaft connection between the wheel and transformer causing a differential electrical output in the well konwn manner. Through the bracket and slide combinations just described the gauging portion of the apparatus is moved into contact with the tire in two steps which insures maximum speed of operation while maintaining maximum shock protection for the delicate transformer. A single disc brake 25 is mounted on the pedestal 11 and adapted to lock bracket 22 in its down position through the action of the brake on projection 26 of the bracket. Additional projections 27 and 28 are provided on bracket 18 to actuate limit switches 29 and 30 whose function will subsequently be explained. A "kicker" or tire ejection mechanism including horizontally disposed plate 31 mounted on side members 32 is provided to eject the tire 12 from the drive and pull down mechanism previously described at the end of a gauging cycle. The horizontal plate 31 and side members 32 are slidably mounted on pedestal 11 and raised and lowered through the action of pneumatic cylinders 33 operated in a conventional manner. A tire marking mechanism is provided on one or both sides of the pedestal 11 to mark the tire to indicate either a satisfactory or unsatisfactory tire as is desired. In the preferred embodiment of the invention the marking mechainsm is used to mark satisfactory tires to provide an indication to the ultimate user that the tire has been tested and found to meet the minimum specifications. The marking mechanism may consist of a pen or swab 34 mounted on a horizontally disposed arm 35 which is in turn connected through a conventional lever system 36 to a pneumatic actuating cylinder 37 mounted on the rear of pedestal 11. A box or housing 38 is conveniently mounted on the side of pedestal 11 and contains the control circuitry utilized with the present device which will subsequently be described. A meter relay 39 is mounted on the other side of pedestal 11 to provide rapid adjustment and control of the over-tolerance point for the particular type of tire being gauged. In addition, a conventional strip chart recorder may be provided adjacent the meter relay to provide a permanent profile record of the tire. The tire drive and pull down mechanism is shown in further detail in FIG. 3. The pull down or tire snugging means comprises the rollers 13 rotatably mounted on members 40 which are pivotally mounted and angularly disposed with respect to mounting bracket 41. The members 40 are pivoted through an angle by means of pneumatic cylinder 42 coupled to members 40 through a conventional bell crank or other similar arrangement 43. As will later be seen when a tire is mounted over drive members 14, the pull down mechanism actuates pivoting the arms 40 outwardly and thereby pressing rollers 13 down and outwardly against the tire beads to pull the tire down firmly into contact with the drive members 14 and idler 16 to assure positive driving characteristics with minimum slippage and at the same time to maintain positive positioning of the tire for gauging purposes. It will be appreciated that such an arrangement minimizes tire wobble and bounce and, hence, insures that any variation in gauge reading in fact represents tread thickness variation. Furthermore, due to the configuration of the drive members a variety of tire sizes may be accommodated without substantial change in the drive element.

Although the operation of the gauge will be apparent from a detailed discussion which will follow, it will be briefly described here. When a tire 12 is placed on the drive members 14 and the start switch operated, the pull down mechanism is actuated to draw the tire into firm contact with the hemispherical drive members 14 through the contact of rollers 13 with the tire beads. The main bracket 18 then is moved downward by a pneumatic cylinder until the limit switch 30 is actuated by extension 28 of the bracket 18. Secondary cylinder 23 then operates to move bracket 22 down so that gauging wheel 17 contacts the tire tread. As will later become apparent, bracket 22 continues to move down even though gauge wheel 17 is in contact with the tire until, through the action of differential transformer 24 and the servo mechanism which will subsequently be described, the system is electrically zeroed, at which point the disc brake 25 actuates to lock bracket 22 in position and the cylinder 23 is exhausted on both sides to remove all pneumatic or hydraulic force from the gauging system. The control circuitry contained in housing 38 then actuates to start rotation of the tire. As differential transformer 24 varies its signal due to a variation in tire tread thickness, the servo mechanism automatically follows, producing an output equal and opposite to the differential transformer signal and impressing the signal on meter relay 39. Since meter relay 39 may be preset to provide any desirable tread thickness tolerance, the signal from the servo provides not only a visual indication of the variation in the tread thickness but also provides the signal on which the acceptance or rejection of a tire is made dependent. If the signal from the servo exceeds the set point at the meter relay, the control circuit automaticaly stops the machine and ejects the tire at which time brackets 22 and 18 move upwardly in a reverse sequence after the brake 25 is deactivated until the projection 27 on bracket 18 operates upper limit switch 29 to stop the movement of the gauging mechanism. If the tire is acceptable, i.e. if the signal from the servo does not exceed the preset tolerance at the meter relay, the control mechanism completes one revolution of the tire and then signals the actuation of the marking or stamping mechanism described which places an indicia on the tire signifying that the tire has met specifications. The pull down mechanism is then retracted, the rollers 13 moving radially inwardly and upwardly, and the kicker mechanism moves up so that the horizontal plate 31 contacts the lower portion of the tire and pushes it up off the drive members 14. The kicker mechanism then returns to the position shown in FIG. 1 and the gauge remains in stand-by until another tire is put in place and the starting mechanism actuated.

While the operation of the electrical control circuitry will be described subsequently in detail, a general knowledge of the indicating and recording servo link utilized in the present invention may be obtained from an examination of FIGS. 4, 5, and 8. FIG. 8 illustrates in block form the gauging and recording circuit of the present invention. The differential transformer 44, corresponding to element 24 in FIG. 1, transmits its output to a conventional amplifier 45. The amplifier 45 amplifies the signal and transmits it to motor 46 which drives the electromechanical servo 47 either clockwise or counterclockwise depending on the value and phase of the signal. The servo sends a feed-back signal by means of a second differential transformer to amplifier 45, the signal being a direct function of the displacement caused by the rotation of motor 46 due to the primary signal from the amplifier 45. The feed-back signal from the servo 47 is used to counterbalance the signal from differential transformer 44 and completes the servo loop. Other outputs from the servo are impressed on meter relay 48 to determine whether the tire is over or under tolerance and also to supply a signal to recording chart 49 to provide a permanent profile record.

Figure 4:
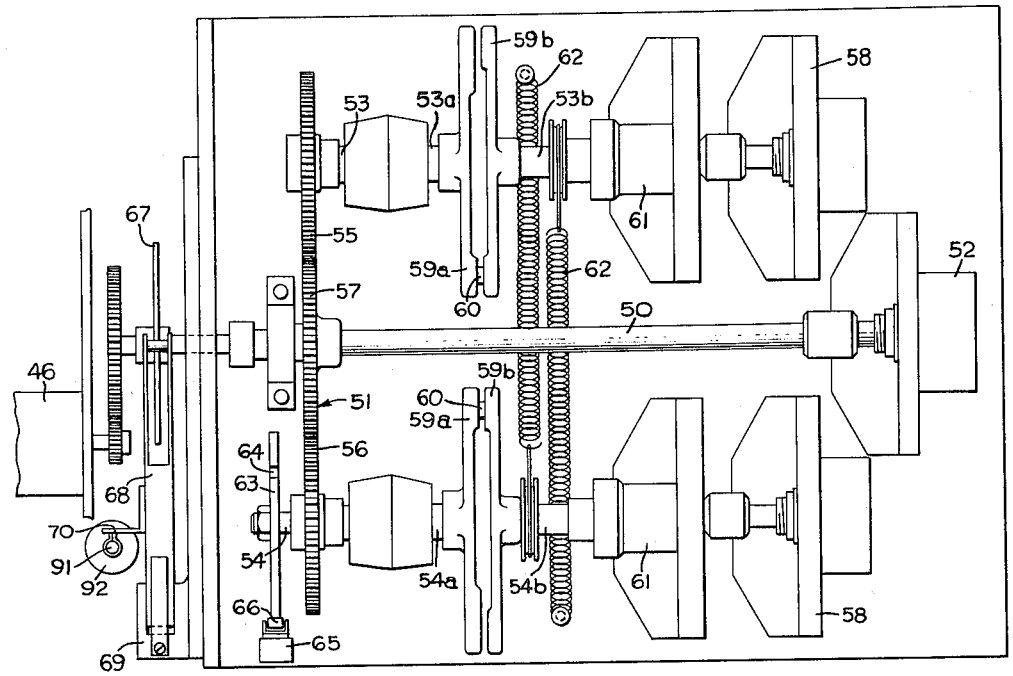
FIG. 4 is a top plan view of a servo mechanism used in the present invention.
Figure 5:
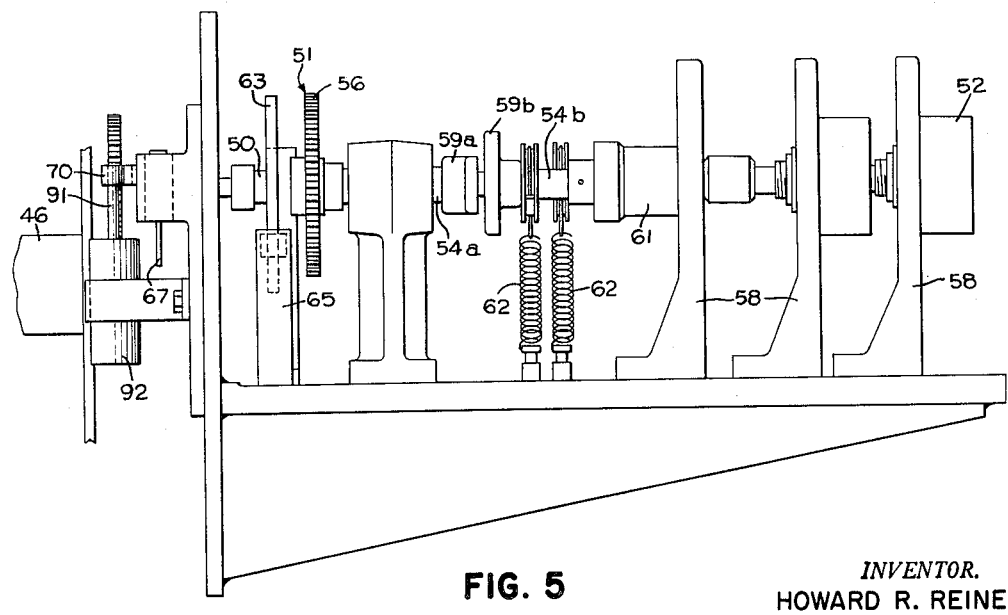
FIG. 5 is a side elevation of the servo mechanism shown in FIG. 4.

The electromechanical servo unit is illustrated in detail in FIG. 4. Motor 46 is coupled to a longitudinal drive shaft 50 through a conventional gear train 51. A potentiometer 52 is mounted at the extreme right end of shaft 50 and generates a signal proportional to the rotational displacement of the shaft due to the operation of servo motor 46. The output of potentiometer 52 may, if desired, be fed to a chart recorder to record in permanent form the tread center profile of a tire being tested. Parallel drive shafts 53 and 54 are geared to shaft 50 through conventional gears 55 and 56 which engage a similar gear 57 pinioned to shaft 50. The three parallel shafts are supported in conventional mounting brackets 58. Shafts 53 and 54 are divided into two axially aligned but separate stub shafts 53a, 53b, 54a, and 54b, respectively. Since the two parallel arrangements are very similar with the exception of the addition of one element to shaft 54, their structure will be described in relationship to shaft 54. The two portions of the shaft 54a and 54b are coupled at an intermediate point by a radially extending arm 59a pinioned to the end of that portion of the shaft numbered 54a. Arm 59a has an axially extending drive pin 60 mounted in one end which engages the mating radially extending arm 59b mounted on shaft portion 54b. As shaft 54a rotates in a clockwise direction (rotations taken from the left end), the pin 60 engages the rear face of arm 59b and rotates it with arm 59a. However, shaft 54b is provided with an electromagnetic brake 61 which is adapted to lock shaft 54b at the point of greatest clockwise displacement and prevent it from returning to the null position until the brake is de-energized. Shaft 53 is similarly constructed but with the arms arranged for counterclockwise displacement. It is thus apparent that due to the limitation of the direction of rotation the dual shafts 53 and 54 provide an indication of maximum variation from the zero point of the quantity being measured, in this case tread thickness. Each of the shafts are provided with a coil spring or other similar device such as shown at 62 which returns them to the null position when the electromagnetic brake 61 is de-energized. If desired, each shaft may be provided with an indicator and scale to permit visual observation of the displacement of the arms as a check against the reading at the meter relay. A circular cam 63 is mounted on one end of shaft 54 and has a groove 64 cut in the outer peripheral surface which corresponds to the zero position of the shaft. A microswitch 65 is mounted adjacent the circular cam 63 and is held in a normally open position until the roller 66 encounters groove 64 at which time the switch closes. As will later become apparent, switch 65 is utilized to indicate the zero or null position of the servo to the control circuit at which time the differential transformer is locked in position by brake 25. By providing for the zeroing of the servo, maximum displacement of the arms 59 etc. in either direction may be effected without encountering the physical limit of rotation during tire testing. The feed-back portion of the servo is provided by the mechanism mounted to the left of the shafts just described. An eccentric cam 67 is mounted on shaft 50 and rotates therewith. Although the eccentricity of the cam may be varied for different purposes, it is constructed for use in the present invention so that as it rotates the effective radius increases in one direction and decreases in the other direction in linear fashion by thousandths of inches. A lever arm 68 is pivotably mounted in bracket 69 and adapted to ride with its free end on eccentric cam 67. It can be seen, therefore, that as cam 67 rotates the lever arm 68 is raised or lowered depending on the change in eccentricity of the cam. An actuator arm 70 is mounted with one end on lever 68 with the other attached to the core element 91 of differential transformer 92, the output of which is fed back to amplifier 45 previously mentioned with regard to FIG. 8. Both shafts 53 and 54 are provided with potentiometers at one end thereof whose outputs are transmitted to meter relay 48 to provide the signals to be compared against the predetermined standard to indicate over or under tolerance of the tire. Further details of the electromechanical servo will be apparent from an examination of elevation view of FIG. 5.

A detail of the control and recording circutry may be seen in FIGS. 6 and 7. Referring to FIG. 6, a 1/6 horsepower motor receives 3 phase power from 3 leads 100, 101, and 102, each of which contains a conventional circuit breaker such as 103 and normally open contacts such as 104. A transformer 105 across the 440 volt 3 phase 60 cycle line steps the voltage down to approximately 115 volts A.C. which provides power to the control circuit through leads 106 and 107. A power-on light 108 is connected in parallel across the power supply. A normally open reset switch 109 is connected through normally closed stop switch 110 and relay 111 across the power line. Normally open contacts 112 are connected in parallel with reset switch 109. A pair of normally open contacts 113 and 114 are in each of the power lines and interrupt power to the control circuit when stop switch 110 is actuated to de-energize relay 111, the latter controlling contacts 112 through 114. A second pair of normally open contacts of the reset switch 109 is connected through relay 115 to power lead 107. Normally open contacts 116 controlled by relay 115 are connected in parallel with the second pair of contacts of the reset switch. The normally open contacts of a foot switch 117 are connected from power line 106 through normally open contacts 118 and relay 119 to lead 107. A pair of normally open contacts 120 are connected in parallel with contacts 118. The normally open contacts of foot switch 117 are connected from power line 106 to position 1 of multiple stepping switch 121, the center tap of which is connected through normally closed contacts 122 and stepping relay 123 to power lead 107. A plurality of switches 124 through 131 are each connected from power lead 106 to poles 2 through 9, respectively, of stepping switch 121. Normally open contacts 132 are connected from lead 106 through over-tolerance light 133 to power lead 107. Normally open contacts 134 are connected through normally open contacts 135 to the center pole of stepping switch 121. A pair of normally closed contacts 136 are located in power line 106. A pair of normally open contacts 137 and 138 are connected to the center pole of stepping switch 121, as is a pair of contacts 139. A pair of normally open contacts 140 are connected to one side of the lower contacts of reset switch 109 through lead 141 and to power line 107 through relay 142. Lead 141 is also connected at a point betwen contacts 134 and 135. Another pair of normally open contacts 143 are connected to lead 141 and through a counter 144 to power lead 107. Normally open contacts 145 through 148 are connected from one power lead through solenoid coils 149 through 152, respectively, to the other power lead. Normally open contacts 153 are connected from power lead 106 through relay 154 and over-load breakers 155 to line 107. A time delay relay 156 is connected from lead 107 to a point between relay 154 and contacts 153. Normally open contacts 157 and 158 are connected from power lead 106 to power lead 107 through solenoid coils 159 and 160, respectively. Normally open contacts 161 are connected across the power leads through solenoid coil 162. A time delay relay 163 and a counter 164 are connected from power lead 107 to a point between contacts 161 and coil 162. Normally open contacts 165 and 166 are connected across the power leads through solenoid coils 167 and 168. Normally open contacts 169 are connected through normally closed contacts 170 and solenoid coil 171. A time delay relay 172 is connected from one power lead to a point between contacts 170 and coil 171. Normally open contacts 173 are connected across the power leads through normally closed contacts 174 and time delay relay 175. A cycle-complete light 176 is connected across the power leads through normally open contacts 177.

Power for the circuit shown in FIG. 7 is provided through leads 180 and 181 which are connected across leads 106 and 107 of FIG. 6. The locking coils 182 of the electromagnetic brakes previously described in regard to the servo mechanism are connected in parallel with the power supply to normally open contacts 183 and also in parallel with a voltage regulator 184 which steps the 115 volt supply down to 5 volts D.C. The brake coils 182 have conventional smoothing and rectifying circuitry associated therewith. The 5 volt output of regulator rectifier 184 is impressed across the potentiometers 185, 186, and 187 which correspond electrically to the three potentiometers mentioned in regard to the servo unit. The output of potentiometers 185 and 187 is connected in a conventional manner across meter relay 188. An auxiliary circuit is provided through meter relay 188 to actuate over-tolerance relay 189 through the resistor 190 and rectifying bridge 191 which is supplied power by means of transformer 192 connected across the power leads 180 and 181. Normally open contacts 193 are located in one of the power leads supplying the primary of transformer 192. With the preceding circuitry in mind the following description of a typical operating cycle of the tire thickness gauge will assist in understanding the present invention.

After a tire has been placed on the driving means 14 in the position shown in FIG. 1, the operator presses foot switch 117 which completes the circuit through the stepping relay 123 which causes stepping switch 121 to advance one pole from the position shown. This causes contacts 157 to be closed energizing coil 159 which causes cylinder 42 shown in FIG. 3 to actuate moving the arms 40 down and radially outward to pull the tire into firm contact with members 14 and idler 16 shown in FIG. 2. When the pressure at cylinder 42 has reached a predetermined point insuring that the tire is firmly held in position, pressure switch 124 closes causing the stepping switch to advance one more position. Contacts 145 are closed thereby energizing coil 149 to actuate the main cylinders moving bracket 18 shown in FIG. 1 down to bring the gauging mechanism toward the tire tread surface. When the bracket has moved down to position, limit switch 30 in FIG. 1 is actuated closing switch 125 which in turn steps the switch 121 to the next position. This causes contacts 147 to close energizing coil 151 and thereby actuating auxiliary cylinder 23 shown in FIG. 1. Cylinder 23 moves bracket 22 downwardly until the gauging roller 27 contacts the tire and the differential transformer 24 is centered. The centering mechanism was previously described in the description of the electromechanical servo and comprises the circular cam 63 and microswitch 65 shown in FIG. 4. When the servo is zeroed, switch 126 which is the electrical portion of microswitch 65 closes stepping switch 121 to the next pole. Contacts 153 are then closed to energize relay 154 and time delay 156. Relay 154 closes normally open contacts 104 in the motor circuit commencing rotation of the tire through the drive mechanism previously desribed. After a predetermined time has elapsed, time delay relay 156 which controls the total revolution time for the tire actuates switch 127 to cause the switch 121 to step to the next position. During the rotation of the tire the recording circuitry shown in FIG. 7 and the servo shown in FIGS. 4 and 5 operate in the manner described to cause constant correction in the servo loop to effectively null balance the signal from the differential transformer mouned on the gauging head. At the conculsion of the cycle and the movement of the stepping switch to the next position, contacts 173 close and time delay 175 is energized. Time delay relay 175 is provided for the purpose of assuring that the tire has completely stopped rotation before the marking mechanism is actuated to place the indicia on the tire indicating acceptability. At the end of the brief cycle of time delay relay 175, contacts 128 are closed and the system is stepped to the succeeding position closing contacts 169 which energizes coil 171 and time relay 172. Coil 171 actuates cylinders 37 causing the marking mechanism to move in and stamp the tire. At the conclusion of the cycle of time delay relay 172 switch 129 is closed to step the system to the succeeding contact. This closes contacts 146 and opens contacts 145 to energize coil 150 and de-energize coil 149 resulting in the release of pressure from one side of the main cylinder 21 and pressuring the other side to raise mounting bracket 18 away from the tire. Simultaneously contacts 148 are closed and 147 are opened energizing coil 152 and de-energizing coil 151 to cause similar action in the secondary cylinder 23, thereby retracting bracket 22 into its normal position. When bracket 18 has reached the fully up position extension 27 of the bracket engages microswitch 29 shown in FIG. 1 closing switch 130 which steps the system to the next position. Contacts 158 close and 157 open, energizing coil 160 and de-energizing coil 159 to reverse the action of cylinder 42 shown in FIG. 1 which retracts the pull down mechanism into its normal position. Simultaneously contacts 161 close energizing time delay relay 163, coil 162, and stepping counter 164. Coil 162 actuates cylinders 33 shown in FIGS. 1 and 3 which brings the kicker mechanism including horizontal kicker plate 31 shown in FIG. 3 to raise and thereby push the tire up off the drive members 14. At the conculsion of the cycle of time delay relay 163 switch 131 closes stepping the system to the next contact, closing contacts 139 which advances the stepping switch completely around to the auto-start position as indicated in FIG. 6 and an entire cycle for an acceptable tire is complete.

In the event that the tire to be tested cannot meet the minimum standards set on the meter relay, the high signal from the potentiometers in the servo system will cause the meter relay to complete the circuit to over-tolerance relay 189 shown in FIG. 7. Over-tolerance relay 189 causes contacts 140 in FIG. 6 to close which energizes relay 142. Relay 142 closes contacts 143, 118, and 138. Simultaneously, contacts 170 and 174 open, de-energizing the marking circuits to prevent marking the tire to indicate acceptability. When contacts 118 close, relay 119 is energized and closes its contacts 120 locking itself into the circuit. At the same time contacts 132 close causing over-tolerance light 133 to light up. The closing of the tolerance limit switch completes the circuit through contacts 138 which had been previously closed by actuation of relay 142 and contacts 137 which were closed by the stepping switch. The completion of this circuit causes the stepping switch to advance from whatever position it is in at the time the over-tolerance relay actuates around the poles to position which closes contacts 146 resulting in the retraction of the guide brackets and ejection of the tire by the kicker means, thus completing the cycle. If at any time during operation of the machine it is desired to reset to the starting position or to permit starting the machine, switch 109 may be closed manually. Actuation of switch 109 energizes relay 111 which closes contacts 112 through 114, locking the relay in and connecting power to the control circuit. At the same time relay 115 is energized which closes contacts 116, locking relay 115 across the line. Relay 116 also closes contacts 135 which completes the circuit through contacts 134, the latter having been closed by stepping switch 121 at the beginning of a cycle and remaining closed throughout. Completion of the aforementioned circuits causes the switch 121 to step completely around to the auto-start position. Relay 115 also opens contacts 136 which disconnects power from the lower portion of the control circuit and holds all operation frozen in position until the switch 121 arrives at the auto-start pole. Contacts 134 then open, dropping relay 115 out and causing a return to normal operation which results in the raising of the guide brackets and ejection of the tire from the drive mechanism.

While certain representative embodiments and details have been shown for the purpose of illustrating the invention, it will be apparent to those skilled in this art that various changes and modifications may be made therein without departing from the spirit or scope of the invention.

I claim:

1. A tire tread thickness variation gauge comprising, in combination, rotatable tire supporting and driving means adapted to contact a tire at the interior tread area thereof and to position said tire horizontally and vertically, said tire supporting and driving means comprising a pair of driven hemispherical members, means to pull said tire firmly down against said support means, reciprocative means movable into contact with outer tread area of the tire, means to rotate said tire supporting means and said tire, means to move said reciprocative means into contact with the tire tread, a first differential transformer means associated with said reciprocative means to determine the magnitude of movement of said reciprocative means during the rotation of said tire and adapted to produce a signal proportional to the movement of said reciprocative means and a servo means responsive to said signal and including a second differential transformer means adapted to derive a signal through the reaction of said servo substantially equal and opposite to the signal of said first differential transformer means whereby a null balance condition is produced by opposing said signals, means to compare the maximum movement of said reciprocating means with a standard as determined by meter relay means and to cause rejection of said tire if said movement exceeds said standard, and means to eject a tire from said support and drive means.

2. A tire tread thickness variation gauge comprising, in combination, rotatable tire supporting and driving means adapted to contact a tire at the interior tread area thereof and to position said tire horizontally and vertically, said tire supporting and driving means comprising a pair of driven hemispherical members, means to pull said tire firmly down against said support means, reciprocative means movable into contact with outer tread area of the tire, means to rotate said tire supporting means and said tire, means to move said reciprocative means into contact with the tire tread, a first differential transformer means associated with said reciprocative means to determine the magnitude of movement of said reciprocative means during the rotation of said tire and adapted to produce a signal proportional to the movement of said reciprocative means and a servo means responsive to said signal and including a second differential transformer means adapted to derive a signal through the reaction of said servo substantially equal and opposite to the signal of said first differential transformer means whereby a null balance condition is produced by opposing said signals, means to compare the maximum movement of said reciprocating means with a standard as determined by meter relay means, marking means to apply indicia to said tire if said movement remains below said standard, and means to eject the tire from said support and drive means if said movement exceeds said standard.

3. A tire tread thickness variation gauge comprising, in combination, rotatable tire supporting and driving means adapted to contact a tire at the interior tread area thereof and to position said tire horizontally and vertically, said tire supporting and driving means comprising a pair of driven hemispherical members, means to pull said tire firmly down against said support means, reciprocative means movable into contact with outer tread area of the tire, means to rotate said tire supporting means and said tire, means to move said reciprocative means into contact with the tire tread, a first differential transformer means associated with said reciprocative means to determine the magnitude of movement of said reciprocative means during the rotation of said tire and adapted to produce a signal proportional to the movement of said reciprocative means and a servo means responsive to said signal and including a second differential transformer means adapted to derive a signal through the reaction of said servo substantially equal and opposite to the signal of said first differential transformer means whereby a null balance condition is produced by opposing said signals, a potentiometer means mechanically connected to said servo means and adapted to derive a signal proportional to the maximum movement of said reciprocating means to compare the maximum movement of said reciprocating means with a standard as determined by meter relay means, said potentiometer means being connected to said meter relay means to present said signal thereto for purposes of comparison with said standard, and means to eject the tire from said support and drive means if said movement exceeds said standard.

References Cited by the Examiner

UNITED STATES PATENTS

| | | | |
|---|---|---|---|
| 2,030,237 | 2/1936 | Brittain et al. | 33—147 |
| 2,047,327 | 7/1936 | Muirhead | 33—174 |
| 2,355,051 | 8/1944 | Braucher | 209—90 |
| 2,511,276 | 6/1950 | Ljungstrom et al. | 33—143 |
| 2,601,447 | 6/1952 | Neff | 33—174 |
| 2,636,277 | 4/1953 | Hawkinson | 33—143 |
| 2,695,981 | 11/1954 | Smoot | 318—32 |
| 2,766,414 | 10/1956 | Jessey et al. | 318—32 |
| 2,812,583 | 11/1957 | Herzegh | 33—147 |
| 2,848,815 | 8/1958 | Scheu | 33—148 X |
| 2,852,851 | 9/1958 | Esken. | |
| 2,988,121 | 6/1961 | Frohlich et al. | |

ISAAC LISANN, *Primary Examiner.*

ROBERT B. HULL, *Examiner.*